(12) United States Patent
Chai et al.

(10) Patent No.: US 8,821,995 B2
(45) Date of Patent: Sep. 2, 2014

(54) FIBER, TAPES, MONOFILAMENTS BASED ON ETHYLENE COPOLYMERS WITH ALFA-OLEFINS

(75) Inventors: Choon Chai, Overijse (BE); Dominique Jan, Beaufays (BE); Stefan Spitzmesser, Brussels (BE)

(73) Assignee: INEOS Manufacturing Belgium NV, Antwerp (BE)

( * ) Notice: Subject to any disclaimer, the term of this patent is extended or adjusted under 35 U.S.C. 154(b) by 335 days.

(21) Appl. No.: 12/735,543

(22) PCT Filed: Feb. 12, 2009

(86) PCT No.: PCT/EP2009/051609
§ 371 (c)(1),
(2), (4) Date: Aug. 23, 2010

(87) PCT Pub. No.: WO2009/101124
PCT Pub. Date: Aug. 20, 2009

(65) Prior Publication Data
US 2010/0304052 A1 Dec. 2, 2010

(30) Foreign Application Priority Data
Feb. 12, 2008 (GB) .................................. 0802550.4

(51) Int. Cl.
*C08F 210/14* (2006.01)
*C08F 210/02* (2006.01)
*C08L 23/08* (2006.01)

(52) U.S. Cl.
USPC ....... 428/17; 428/36.92; 526/348; 526/348.2; 525/240; 442/181; 442/327

(58) Field of Classification Search
CPC ...... C08F 210/14; C08F 210/02; C08L 23/08; A41G 1/00; B32B 5/02; B32B 1/02; D01F 6/30
USPC ...................... 428/17, 36.92; 526/348, 348.2; 525/240; 442/181, 327; 87/13
See application file for complete search history.

(56) References Cited

U.S. PATENT DOCUMENTS

| 4,880,691 A | 11/1989 | Sawyer et al. |
| 4,990,204 A | 2/1991 | Krupp et al. |

FOREIGN PATENT DOCUMENTS

| EP | 1 469 104 A1 | 10/2004 |
| WO | WO 93/24686 | * 12/1993 |
| WO | WO 93/24686 A1 | 12/1993 |
| WO | WO 2007/082817 A1 | 7/2007 |

* cited by examiner

*Primary Examiner* — Robert D. Harlan
(74) *Attorney, Agent, or Firm* — Nixon & Vanderhye, P.C.

(57) ABSTRACT

Fibers, tapes, monofilaments including copolymers of ethylene and α-olefins which exhibit improved tensile properties expressed as a balance between tenacity and elongation at break. The copolymers may be prepared by use of metallocene catalyst systems in particular by use of monocyclopenadienyl catalyst systems. The fibers, tapes, monofilaments of the invention are particularly suitable for end-use applications including artificial grass, woven and nonwoven fabrics, cordages, ropes, netting and flexible intermediate bulk containers.

28 Claims, 1 Drawing Sheet

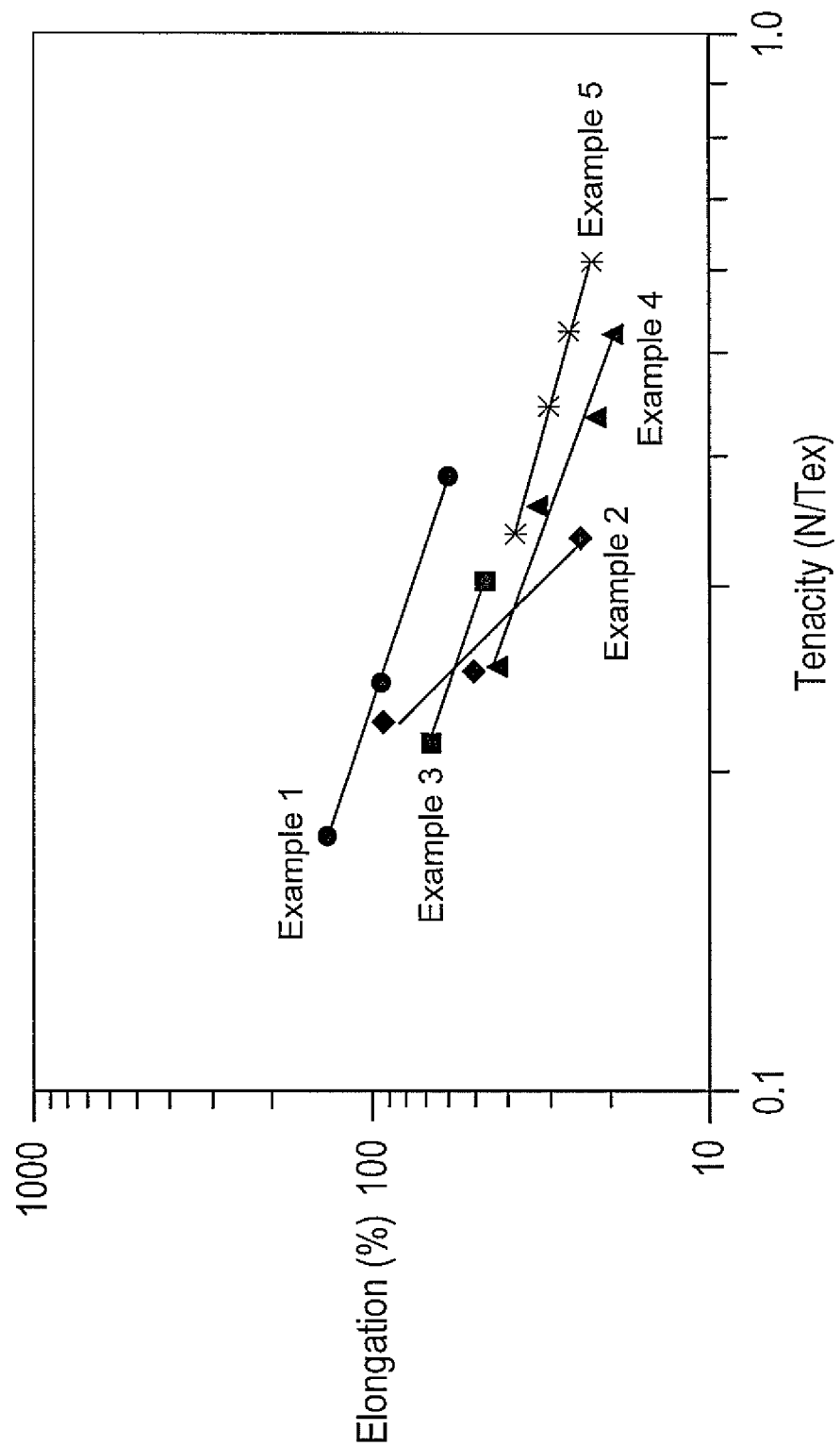

FIBER, TAPES, MONOFILAMENTS BASED ON ETHYLENE COPOLYMERS WITH ALFA-OLEFINS

This application is the U.S. national phase of International Application No. PCT/EP2009/051609 filed 12 Feb. 2009 which designated the U.S. and claims priority to British Patent Application No. 0802550.4 filed 12 Feb. 2008, the entire contents of each of which are hereby incorporated by reference.

The present invention relates to polymers and in particular to copolymers of ethylene and alpha-olefins in particular to linear low density polyethylenes (LLDPE) and to articles thereof in particular to fibres, tapes, monofilaments and the like.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD).

Certain properties of metallocene derived polymers are enhanced by narrow MWD and these materials may be manufactured into useful articles relative to Ziegler produced materials. However for some applications the uniform nature of the SCBD of metallocene produced materials may not readily permit certain structures to be obtained.

Monofilaments have a variety of geometries eg. circular, flat, diamond shape etc. which may define the final properties such as softness, abrasion and the like. For example when used for artificial grass applications producers optimize this shape in order to provide the required balance of properties. Generally monofilament may be manufactured by a melt spinning process with their sizes ranging from 0.1 to 2.5 mm in diameter depending on the intended end use. Polyethylenes have been typically used as raw materials for making monofilaments.

Stretched tapes are prepared from a primary film produced by a blown or a cast film process. The film may be cut into tapes and then oriented typically by stretching the film while passing through an air oven or on a hot plate at a temperature below the melting point.

Synthetic or artificial turf or grass has been used to replace natural grass on playing. surfaces in particular on sport fields. Polymer compositions useful for this application need to exhibit the necessary stiffness, resilience, UV stability and wear resistance as well as a softness to prevent injury.

EP 1469104 describes metallocene produced polyethylenes for fibre applications such as monofilaments or tapes. The polyethylenes are prepeard from either bis-indenyl or bis(cyclopentadienyl) metallocene complexes activated by aluminoxanes. The polyethylenes typically exhibit a density in the range 0.925-0.950 g/cm$^3$ and melt index in the range 0.1-5.0 g/10 min.

WO 94/12699 describes fibres of polyethylene copolymers having density in the range 0.86 to 0.91, melt index in the range 4 to 1000 and Mw/Mn in the range 2 to 3.5 produced by use of single site catalysts in particular bis(cyclopentadienyl) metallocene complexes.

WO 07/107,307 describes synthetic turf for grass field comprising individual filament yarns consisting essentially of a mixture of a high density polyethylene (HDPE) and a linear low density polyethylene (LLDPE).

JP 2007016367 describes threads for artificial grass mainly comprising 70-95 wt % of a high density polyethylene and 5-30 wt % of an ethylene-alpha-olefin copolymer having a density in the range 0.900-0.925 g/cm$^3$ obtained by use of a metallocene catalyst.

WO 06/053709 describes tapes, fibres or filaments based on multimodal polyethylenes comprising from 30-70 wt % of an ethylene polymer fraction (A) having a melt index of at least 1 g/10 min and a density of at least 950 kg/m$^3$ and an ethylene polymer fraction (B) comprising ethylene and an alpha-olefin containing from 4 to 10 carbon atoms and having a melt index of 0.001 to 1 g/10 min and a density of no more than 950 kg/m$^3$.

U.S. Pat. No. 4,880,691 describes fibres and multifilaments derived from linear low density copolymers (LLDPE) of ethylene and alpha-olefins having 3-12 carbon atoms produced from Ziegler based catalysts. The copolymers typically have density in the range 0.86 to 0.95 gms/cc and melt index in the range 0.01 to 400 g/10 min.

WO 94/25647 describes elastic fibres, fabrics and similar based on homogeneously branched substantially linear ethylene polymers having a molecular weight distribution of less than 3.5 and a density less than 0.90 g/cm$^3$. The ethylene polymers may be prepared using constrained geometry metallocene catalyst technology preferably by solution polymerization. Most suitable polymers comprise ethylene octene copolymers.

WO 08/113,566 and WO 08/113,567 describe fibres, tapes or filaments comprising polyethylene compositions obtainable by use of single site catalysts wherein the polyethylene compositions have a density of less than 980 kg/m$^3$ and preferably less than 975 kg/m$^3$. The polyethylene compositions are unimodal and preferably exhibit a melt index (2.16 kg) in the range 0.7-4.0 g and a Mw/Mn in the range 2-4 and are suitably prepared by use of bis(cyclopentadienyl) metalloene catalyst systems. Resultant fibres exhibit a good comparison between tenacity and elongation at break compared with commercial fibres.

Our earlier published application WO 06/085051 and copending application PCT EP2007/063670 described copolymers of ethylene and alpha-olefins prepared from metallocene catalyst systems having a density in the range 0.900-0.940 g/cm$^3$, a melt index MI$_2$ (2.16 kg, 190° C.) in the range of 0.01-50 g/10 min and a molecular weight distribution (Mw/Mn) in the range 3.5 to 4.5. These copolymers also exhibited a melt elastic modulus G' (G"=500 Pa) in the range 40 to 150 Pa and an activation energy of flow (Ea) in the range 28-45 kJ/mol but which have low or moderate amounts of LCB.

The aforementioned metallocene derived copolymers are particularly suitable for the production of films and sheets prepared using traditional methods well known in the art. Examples of such methods are film blowing, film casting and orientation of the partially crystallised product. The films exhibit good processability, improved optical and mechanical properties and good heat sealing properties.

In order for use in applications such as tapes, fibres, monofilaments, artificial grass and the like suitable polymers require molecular structures such as for example relatively broad molecular weight distributions and long chain branching (LCB) in order to provide good strain-hardening and the required balances of melt strength and drawability.

We have now found that certain polyethylenes in particular metallocene-derived polyethylenes exhibit outstanding properties in the solid state when submitted to high deformation or to mechanical stress at high temperatures. Without wishing to be bound by theory, the excellent mechanical properties are believed to be linked to the specific semi-crystalline structure of the said particular metallocene-derived polyethylenes. The polyethylenes thus obtained are particularly suitable for highly thermal or mechanical demanding applications like the preparation of articles including tapes, fibres, monofilaments and the like. The end-use applications of these tapes, fibres, monofilaments and the like include artificial grass and synthetic sport surfaces, woven and nonwoven fabrics, floor coverings, sacks, flexible intermediate bulk containers (FIBC), apparels, domestic uses, carpets, rugs, upholstery, agrotextiles, geotextiles, construction sheeting, filtration, ropes, twines, cordage, nets, wraps, bags, medical, hygiene, diapers, durable paper, wiping cloths, strapping, polymer-wood fibre composites, polymer-concrete reinforcement, thermal binder fibre in nonwoven composites, glass fibre composites for the preparation of masterbatches (colour, functional properties) for textile appplications and the like.

The resultant fibres, tapes and the like exhibit improved tensile properties expressed as the balance between tenacity and elongation at break. In particular it has been found that the melt index of the polymers may be increased to the benefit of the product processability while maintaining the balance between tenacity and elongation at break.

Thus according to a first aspect of the present invention there is provided a tape, fibre filament or similar comprising a polyethylene composition comprises a copolymer of ethylene and an α-olefin said copolymer having (a) a density in the range 0.900-0.970 g/cm$^3$, and
(b) a melt index MI$_2$ (2.16 kg,190° C.) in the range 0.7-50 g/10 min characterized in that said fibre, tape, filament or similar has a tenacity, elongation at break (%) and melt index wherein $$[\delta \log(\text{elongation})/\delta(\text{tenacity})] \geq M \times (\text{melt index}) + C$$

wherein M=−0.45 and C=−0.55

Preferably the polyethylene composition of the present invention has a unimodal molecular weight distribution.

Thus according to another aspect of the present invention there is provided a tape, fibre filament or similar comprising a polyethylene composition comprises a copolymer of ethylene and an α-olefin having a unimodal molecular weight distribution said copolymer having (a) a density in the range 0.900-0.970 g/cm$^3$, and
(b) a melt index MI$_2$ (2.16 kg,190° C.) in the range 0.7-50 g/10 min characterized in that said fibre, tape, filament or similar has a tenacity, elongation at break (%) and melt index wherein $$[\delta \log(\text{elongation})/\delta(\text{tenacity})] \geq M \times (\text{melt index}) + C$$

wherein M=−0.48 and C=−0.68

Preferably the fibre, tape, filament or similar has a tenacity, elongation at break (%) and melt index wherein
wherein M=−0.43 and C=−0.9

Preferably the polyethylene composition of the present invention is prepared by polymerization in the presence of a single site catalyst system.

Thus according to another aspect of the present invention there is provided a tape, fibre, filament or similar comprising a polyethylene composition comprises a copolymer of ethylene and an α-olefin prepared by polymerization in the presence of a single site catalyst system said copolymer having (a) a density in the range 0.900-0.970 g/cm$^3$, and
(b) a melt index MI$_2$ (2.16 kg,190° C.) in the range 0.01-50 g/10 min characterized in that said fibre, tape, filament or similar has a tenacity, elongation at break (%) and melt index wherein $$[\delta \log(\text{elongation})/\delta(\text{tenacity})] \geq M \times (\text{melt index}) + C$$

wherein M=−0.43 and C=−1.2

Preferably the fibre, tape, filament or similar according to this aspect of the present invention has a tenacity, elongation at break (%) and melt index wherein
wherein M=−0.43 and C=−0.9

Most preferably the fibre, tape, filament or similar has a tenacity, elongation at break (%) and melt index wherein
wherein M=−0.43 and C=0.78

The fibre, tape, filament or similar according to this aspect of the present invention has a tenacity and elongation at break (%) wherein
(i) elongation (%)≥21.4×(tenacity)$^{-1.05}$
(ii) tenacity≥0.16 N/Tex Preferably the fibre, tape, filament or similar according to this aspect of the present invention has a tenacity and elongation at break (%) wherein
(i) elongation (%)≥11.5×(tenacity)$^{-1.4}$
(ii) tenacity≥0.16 N/Tex The polyethylene compositions according to all aspects of the present invention preferably have a melt index in the range 0.7 to 25 g/10 min, more preferably in the range 0.7 to 15 g/10 min and most preferably in the range 0.7 to 5 g/10 min.

The polyethylene compositions according to all aspects of the present invention preferably have a density in the range 0.915-0.970 g/cm$^3$ and most preferably in the range 0.915-0.950 g/cm$^3$.

The polyethylene compositions according to all aspects of the present invention preferably have a molecular weight distribution in the range 3 to 8.

The fibre, tape, filament or similar according to all aspects of the present invention may typically be in stretched form.

The fibre, tape, filament or similar according to all aspects of the present invention have a draw ratio in the range 1:4 to 1:10 and preferably 1:5 to 1:10.

According to another aspect of the present invention there is provided a tape, fibre, filament or similar comprising a polyethylene composition comprises a copolymer of ethylene and an α-olefin having
(i) a density in the range 0.900-0.970 g/cm$^3$,
(ii) a melt index MI$_2$ (2.16 kg, 190° C.) in the range 0.01-50 g/10 min,
(iii) a melt flow ratio (MFR) in the range 20 to 50,
(iv) a molecular weight distribution (Mw/Mn) in the range 3 to 8, and
(v) a melt strength pressure derivative δ(MS)/δP in the range 0.15-1.5.

According to another aspect of the present invention there is provided a tape, fibre, filament or similar comprising a polyethylene composition comprises a copolymer of ethylene and an α-olefin having
(i) a density in the range 0.930-0.970 g/cm$^3$,
(ii) a melt index MI$_2$ (2.16 kg, 190° C.) in the range 0.1-3.5 g/10 min,
(iii) a melt elastic modulus G' (G"=500 Pa) in the range 40-150, and
(iv) a ratio of complex dynamic shear viscosities η*(0.1)/η*(100) in the range 1.5-5.5.

Preferred alpha-olefins are those having C4-C12 carbon atoms. Most preferred alpha-olefins are 1-butene, 1-hexene, 4-methyl-1-pentene and 1-octene.

The copolymers of the present invention may suitably be prepared by use of a single site catalyst system and preferably by use of a metallocene catalyst system comprising, preferably a monocylcopentadienyl metallocene complex having a 'constrained geometry' configuration together with a suitable activator.

Examples of monocyclopentadienyl or substituted monocyclopentadienyl complexes suitable for use in the present invention are described in EP 416815, EP 418044, EP 420-436 and EP 551277.

Suitable complexes may be represented by the general formula:

$$CpMX_n$$

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

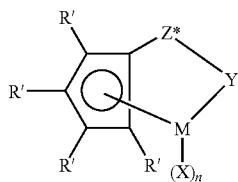

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—,
M is hafnium, titanium or zirconium,
Z* is SiR*$_2$, CR*$_2$, SiR*$_2$SiR*$_2$, CR*$_2$CR*$_2$, CR*=CR*, CR*$_2$SiR*$_2$, or
GeR*$_2$, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-inethoxyphenylamido) dimethyl (tetramethyl-$\eta^5$-cyclopentadienyl) silanetitanium dichloride.

Particularly preferred metallocene complexes for use in the preparation of the copolymers of the present invention may be represented by the general formula:

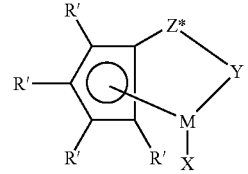

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is SiR*$_2$, CR*$_2$, SiR*$_2$SiR*$_2$, CR*$_2$CR*$_2$, CR*=CR*, CR*$_2$SiR*$_2$, or
GeR*$_2$, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane- or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-$\eta^5$-cyclopentadienyl) dimethyl silanetitanium-$\eta^4$-1.3-pentadiene.

Suitable cocatalysts for use in the preparation of the copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

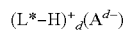

wherein:—
L* is a neutral Lewis base
$(L^*-H)^+_d$ is a Bronsted acid
$A^{d-}$ is a non-coordinating compatible anion having a charge of $d^-$, and
d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris (pentafluorophenyl)(hydroxyphenyl) borate
tris (pentafluorophenyl)(4-hydroxyphenyl) borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl)methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl)methyl ammonium tris (pentafluorophenyl) (4-hydroxyphenyl) borate.

With respect to this type of cocatalyst, a preferred compound is the reaction product of an alkylammonium tris(pentafluorophenyl)-4-(hydroxyphenyl) borate and an organometallic compound, for example triethylaluminium or an aluminoxane such as tetraisobutylaluminoxane.

The catalysts used to prepare the copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Particularly suitable catalysts for use in the preparation of the copolymers of the present invention are metallocene complexes which have been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene and 1-hexene.

The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The copolymers are most suitably prepared in a gas phase process.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Preferred gas phase processes are those operating in a fluidised bed. Particularly preferred gas phase processes are those operating in "condensed mode" as described in EP 89691 and EP 699213 the latter being a particularly preferred process.

By "condensed mode" is meant the "process of purposefully introducing a recycle stream having a liquid and a gas phase into a reactor such that the weight percent of liquid based on the total weight of the recycle stream is typically greater than about 2.0 weight percent".

The polyethylene compositions suitable for use in the present invention may comprise blends of polymers for example a blend of (a) a copolymer of ethylene and a α-olefin prepared by polymerization in the presence of a single site catalyst system and (b) a polymer prepared by polymerization in the presence of a Ziegler Natta catalyst system.

Preferred polyethylene compositions for use in this aspect of the present invention may comprise blends of (A) 1-99% by weight of a copolymer of ethylene and a α-olefin having from 3 to 10 carbon atoms, and (B) from 1-99% by weight of a copolymer of ethylene and a α-olefin having from 3 to 10 carbon atoms, prepared by polymerization in the presence of a single site catalyst system, wherein the sum of (A) and (B) is 100%.

Thus according to another aspect of the present invention there is provided a fibre, tape, filament or similar comprising a polyethylene composition wherein said polyethylene composition comprises a polymer blend of (A) 1-99% by weight of a copolymer of ethylene and a α-olefin having from 3 to 10 carbon atoms, and (B) from 1-99% by weight of a copolymer of ethylene and a α-olefin having from 3 to 10 carbon atoms, prepared by polymerization in the presence of a single site catalyst system, wherein the sum of (A) and (B) is 100%, said copolymer blend having (a) a density in the range 0.900-0.970 μg/cm³, and
(b) a melt index $MI_2$ (2.16 kg, 190° C.) in the range 0.7-50 g/10 min characterized in that said fibre, tape, filament or similar has a tenacity, elongation at break (%) and melt index wherein $$[\delta \log(\text{elongation})/\delta(\text{tenacity})] \geq \delta M \times (\text{melt index}) + C$$

wherein M=−0.45 and C=−0.55

The application of the copolymers of the present invention to tapes, fibres, filaments or similar may be by methods well known in the art and to which the skilled expert would readily understand.

The tapes, fibres, filaments or similar of the present invention may additionally contain usual additives well known to those skilled in the art such as antioxidants, stabilizers, processing aids, fillers, flame retardants, coloured pigments or similar.

These additives may be present in the tapes, fibres, filaments or similar in quantities generally between 0.01 and 15 weight %.

The present invention is particularly directed to tapes, monofilaments and to fibres suitable for use in artificial turfs or grasses including synthetic sporting surfaces.

Fibres obtained from copolymers prepared using metallocene complexes and in particular from monocyclopentadienyl metallocene complexes, exhibit a similar compromise between tenacity and elongation at break as fibres prepared from traditional Ziegler Natta catalysts but at lower density enabling the final fibres to be softer and therefore advantageous for artificial grass applications. Alternatively the melt index of the copolymers produced with monocyclopentadienyl metallocene complexes may be increased to the benefit of the product processability while maintaining a similar balance between tenacity and elongation at break. In addition the fibres obtained from the copolymers in the present invention also show improvements over those prepared using catalyst systems comprising bis(cyclopentadienyl) metallocene complexes.

The present invention will now be further illustrated with reference to the following examples:

EXAMPLES

General Catalyst Preparation (a) Treatment of Silica with TEA

Under continuous agitation, 1491 L of isohexane and 397 kg of silica D948 (available from W.R. Grace), were added to a reactor. (The silica had been previously calcined under nitrogen to reach a level of hydroxyl groups of 1.53 mmol/g). 19.3 kg of an Octastat 2000 (available from Octel) solution in pentane (2 g/l) was then added and the mixture was stirred for 15 minutes. 571 kg of a 12% triethylaluminium (TEA) solution in isohexane was then slowly added over 1 hour and the mixture was stirred for 1 hour further at 30° C. The slurry was filtered and thoroughly washed with isohexane before being transferred to a dryer. 19 kg of an Octastat 2000 solution in pentane (2 g/l) was added and the mixture was finally dried at 60° C. under vacuum. 428 kg of silica/TEA were obtained. The aluminium content of the solid was found to be 1.3 mmol/g.

(b) Preparation of Catalyst Component 1

To 216.9 kg of a 9.58% solution of $[N(H)Me(C_{18-22}H_{37-45})_2]$ $[B\ (C_5F_5)_3(p\text{-}OHC_6H_4)]$ Ionic Compound A) in toluene were added over 15 minutes 17.75 kg of 11.7% TEA solution in isohexane. The mixture was further stirred for 15 minutes to yield a solution of catalyst component 1.

(c) Preparation of a Mixture of $(C_5Me_4SiMe_7N^tBu)Ti(\eta^4\text{-}1,3\text{-pentadiene})$ (Complex A) with 1 hexene To 53.0 kg of a 11.6% solution of Complex A in heptane were added 47.8 kg of 1-hexene.

(d) Preparation of the Supported Catalyst 288 kg of the above prepared silica/TEA was introduced into a reactor. The above prepared solution of catalyst component 1 was fed to the reactor over 45 minutes and the mixture was then stirred for further 30 minutes. The contents of the reactor were then cooled to 15° C. and the above prepared solution of Complex A and 1-hexene was fed over a period of 30 minutes, and then the mixture was further stirred for 1 hour. During the addition the internal temperature increased to a maximum of 23° C. 34 kg of an Octastat 2000 solution in pentane (2 g/l) was then added and the mixture was dried at 45° C. until the residual solvent content in the catalyst was <1%.

Analysis of the resulting dry powder showed the titanium content to be 44.0 µmol/g, the boron content to be 53.7 µmol/g and the aluminium content to be 1.02 mmol/g.

Examples 1 to 4

The copolymers according to the present invention were prepared by copolymerisation of ethylene with hexene in a gas phase fluidized bed reactor having a 0.74 m diameter and using the catalyst system prepared above. Detailed process conditions are summarized in Table 1.

TABLE 1

|  |  | Example | | | |
|---|---|---|---|---|---|
|  |  | 1 | 2 | 3 | 4 |
| Temperature | °C. | 85 | 85 | 80 | 85 |
| Total pressure | bar | 20.3 | 20.3 | 20.0 | 20 |
| Bed height | m | 5.5 | 5.5 | 5.5 | 5.0 |

TABLE 1-continued

|  |  | Example | | | |
|---|---|---|---|---|---|
|  |  | 1 | 2 | 3 | 4 |
| Ethylene partial pressure | bar | 13.5 | 13.5 | 12.4 | 13.3 |
| Hydrogen/ethylene ratio | mol/mol | 0.0017 | 0.0025 | 0.0026 | 0.0014 |
| Hexene/ethylene ratio | mol/mol | 0.0022 | 0.0029 | 0.0045 | 0.0015 |
| Pentane partial pressure | b | 2.5 | 1.5 | 2.6 | 2.5 |
| Residence time | h | 3.5 | 3.5 | 4.1 | 4.8 |
| Space time yield | kg/h/m3 | 67.7 | 85 | 70 | 70 |
| Stadis 425 | ppm | 10 | 10 | 10 | 10 |

The polyethylene powders were compounded under nitrogen atmosphere on a ZSK58 extruder with the following additive package: to 99.88 parts of the polyethylene composition, 0.08 part of Irgafos® 168 and 0.04 part of Irganox® 1076 were added. The resulting product was submitted to detailed characterization as summarized in Table 2. The corresponding product characteristics of comparative polymers are shown in Table 3.

TABLE 2

(Inventive examples)

|  |  | Example | | | | |
|---|---|---|---|---|---|---|
|  |  | 1 | 2 | 3 | 4 | 5* |
| density | kg/m³ | 936.1 | 937.8 | 918.8 | 942.5 | 939.5 |
| MI$_2$ | g/10 min | 1.1 | 5.8 | 1.2 | 0.88 | 0.80 |
| melt flow ratio (MFR) |  |  | 22.7 |  | 23.3 |  |
| Mw/Mn |  |  | 4.1 |  |  |  |
| dynamic viscosity [Eta*$_{100}$] at 100 rad/s | Pa · s | 1751 | 552 | 1832 | 1656 |  |
| dynamic viscosity [Eta*$_{0.1}$] at 0.1 rad/s | Pa · s | 7208 | 1198 | 6522 | 8976 |  |
| Eta*$_{100}$/Eta*$_{0.1}$ ratio |  | 4.1 | 2.2 | 3.6 | 4.9 |  |
| G'(G" = 500 Pa) | Pa | 58.6 | 28 | 48.9 | 59.6 |  |
| δ(MS)/δP | cN/MPa | 0.21 |  | 0.18 |  | 0.36 |

TABLE 3

(Comparative examples)

|  |  | Example | | | | |
|---|---|---|---|---|---|---|
|  |  | CE1 | CE2 | CE3 | CE4 | CE5 |
| density | kg/m³ | 936 | 939 | 919.4 | 946.4 | 944.5 |
| MI$_2$ | g/10 min | 1.1 | 4.5 | 0.9 | 0.61 | 0.39 |
| melt flow ratio (MFR) |  |  |  |  |  |  |
| Mw/Mn |  |  |  |  |  |  |
| dynamic viscosity [Eta*$_{100}$] at 100 rad/s | Pa · s | 1759 | 736 | 1638 | 1738 | 2209 |
| dynamic viscosity [Eta*$_{0.1}$] at 0.1 rad/s | Pa · s | 8541 | 2000 | 9824 | 20068 | 21369 |
| Eta*$_{100}$/Eta*$_{0.1}$ ratio |  | 4.9 | 2.7 | 6.0 | 11.5 | 9.7 |
| G'(G" = 500 Pa) | Pa | 37.6 | 36.6 | 54.2 | 95.6 | 107 |
| δ(MS)/δP | cN/MPa |  |  |  |  |  |

Tables 4 and 5 show the mechanical properties of tapes produced from both the copolymers according of the present invention and the comparative polymers.

TABLE 4

(Inventive Examples)

| | Example | | | | |
|---|---|---|---|---|---|
| | 1 | 2 | 3 | 4 | 5 |
| Draw ratio of 1:4 | | | | | |
| Tex (g/1000 m) | 136 | | 141.1 | | |
| Tenacity (N/Tex) | 0.174 | | 0.229 | | |
| Elongation at break (%) | 136 | | 146.6 | | |
| Draw ratio of 1:5 | | | | | |
| Tex (g/1000 m) | 110.5 | | 116.7 | | |
| Tenacity (N/Tex) | 0.242 | | 0.213 | | |
| Elongation at break (%) | 93.8 | | 67.4 | | |
| Draw ratio of 1:6 | | | | | |
| Tex (g/1000 m) | | 132.2 | 100.3 | 88.6 | |
| Tenacity (N/tex) | | 0.222 | 0.304 | 0.251 | |
| Elongation at break (%) | | 92.7 | 46.1 | 42.5 | |
| Draw ratio of 1:7 | | | | | |
| Tex (g/1000 m) | 80.7 | 116.6 | | 76.2 | 80.2 |
| Tenacity (N/tex) | 0.382 | 0.249 | | 0.358 | 0.337 |
| Elongation at break (%) | 31.2 | 49.6 | | 32.8 | 37.5 |
| Draw ratio of 1:8 | | | | | |
| Tex (g/1000 m) | | 100.9 | | 68.2 | 71.1 |
| Tenacity (N/tex) | | 0.333 | | 0.435 | 0.445 |
| Elongation at break (%) | | 24.2 | | 21.9 | 30 |
| Draw ratio of 1:9 | | | | | |
| Tex (g/1000 m) | | | | 60.7 | 64.4 |
| Tenacity (N/tex) | | | | 0.522 | 0.524 |
| Elongation at break (%) | | | | 19.5 | 26.2 |
| Draw ratio of 1:10 | | | | | |
| Tex (g/1000 m) | | | | | 58 |
| Tenacity (N/tex) | | | | | 0.6111 |
| Elongation at break (%) | | | | | 22.5 |

*Example 5 is an 80:20 blend of comparative example CE4 and inventive example 3.

TABLE 5

(Comparative examples)

| | Example | | | | |
|---|---|---|---|---|---|
| | CE1 | CE2 | CE3 | CE4 | CE5 |
| Draw ratio of 1:4 | | | | | |
| Tex (g/1000 m) | 145 | | 136.5 | | |
| Tenacity (N/Tex) | 0.159 | | 0.134 | | |
| Elongation at break (%) | 155.1 | | 151 | | |
| Draw ratio of 1:5 | | | | | |
| Tex (g/1000 m) | 119.8 | | | | |
| Tenacity (N/Tex) | 0.188 | | | | |
| Elongation at break (%) | 90.8 | | | | |
| Draw ratio of 1:6 | | | | | |
| Tex (g/1000 m) | 103.9 | 98.0 | 93.8 | | |
| Tenacity (N/tex) | 0.230 | 0.216 | 0.225 | | |
| Elongation at break (%) | 53.6 | 100.0 | 62.2 | | |
| Draw ratio of 1:7 | | | | | |
| Tex (g/1000 m) | 91.2 | 84.9 | | 82.9 | 61 |
| Tenacity (N/tex) | 0.299 | 0.239 | | 0.329 | 0.400 |
| Elongation at break (%) | 35.1 | 59.1 | | 41.0 | 28 |
| Draw ratio of 1:8 | | | | | |
| Tex (g/1000 m) | | 73.4 | | 74.3 | 53 |
| Tenacity (N/tex) | | 0.293 | | 0.440 | 0.510 |
| Elongation at break (%) | | 38.3 | | 31.3 | 24 |
| Draw ratio of 1:9 | | | | | |
| Tex (g/1000 m) | | | | 67.8 | 52 |
| Tenacity (N/tex) | | | | 0.523 | 0.570 |
| Elongation at break (%) | | | | 26.8 | 20 |

CE1 = LLDPE produced in a gas phase process similar to Example 1 but using a Ziegler catalyst prepared according to example 1 of EP 998503.
CE2 = commercial hexene copolymer from Ineos (Eltex AF7040F1365)
CE3 = commercial hexene copolymer from Ineos (LL6208AF)
CE4 = commercial hexene copolymer from Ineos (Eltex A5006FN0095)
CE5 = commercial butene copolymer from Ineos (Eltex A5006FN1362)

Table 6 below shows the relationship between $\delta$ log(elongation)/$\delta$ log(tenacity) for the examples of the invention and the comparative examples.

TABLE 6

| Example | $\delta$log(elongation)/$\delta$log(tenacity) |
|---|---|
| 1 | −1.054 |
| 2 | −3.145 |
| 3 | −1.075 |
| 4 | −1.122 |
| 5 | −0.851 |
| CE1 | −2.337 |
| CE2 | −2.967 |
| CE3 | −1.710 |
| CE4 | −0.922 |
| CE5 | −0.864 |

Determination of Product Properties

Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Melt index: $MI_2$ and $MI_{21}$ were measured using the procedures of ISO 1133 at 190° C. using loads of 2.16 and 21.6 kg respectively.

Melt flow ratio (MFR) is given by the ratio of $MI_{21}$ against $MI_2$.

Gel Permeation Chromatography Analysis for Molecular Weight Distribution Determination Apparent molecular weight distribution and associated averages, uncorrected for long chain branching, were determined by Gel Permeation Chromatography using a GPCV 2000 from Waters. Acquisition is done using Alliance software from the same supplier.

The apparatus settings were the following:
Column temperature: 150° C.
Injector temperature: 150° C.
Pump temperature: 50° C.
Injection volume: 217.5 µl
Elution time: 60 min
Eluant: 1,2,4 Trichlorobenzene stabilised with 0.05% BHT
Flow rate: 1 ml/min
Columns set: 2 Shodex AT806MS+1 Waters HT2 with a plate count (at half height) of typically 26,000
Detector: differential refractometer Prior the elution, the polyethylene samples were dissolved at 150° C. for 2 hours with stirring in 1,2,4 Trichlorobenzene stabilised with 0.05% BHT. The polyethylene concentration is 0.1% w/w.

A relative calibration was constructed using narrow polystyrene standards. The molecular weight and the solution concentrations are listed in the below table.

| PS Standard (Vial number) | Molecular Weight (PS) | Polydispersity (PD) | Mass (mg) for 30 ml of solvent |
|---|---|---|---|
| 1 | 76600 | 1.03 | 34.125 |
| 2 | 3900000 | 1.05 | 6.75 |
|   | 50400 | 1.03 | 42.75 |
| 3 | 1950000 | 1.04 | 8.625 |
|   | 30300 | 1.02 | 42.75 |
| 4 | 995000 | 1.04 | 8.625 |
|   | 21000 | 1.02 | 42.75 |
| 5 | 488400 | 1.05 | 17.25 |
|   | 9860 | 1.02 | 51.375 |
| 6 | 195000 | 1.02 | 25.5 |
|   | 2100 | 1.05 | 68.25 |

The elution volume, V, was recorded for each PS standards.

The PS molecular weight was converted in PE equivalent using the following Mark Houwink constants:
$\alpha_{PS}=0.67$ $K_{PS}=0.000175$
$\alpha_{PE}=0.706$ $K_{PE}=0.00051$ The calibration curve $Mw_{PE}=f(V)$ was then fitted with a $3^{rd}$ polynomial equation. All the calculations are done with Millennium 32 software from Waters.

This calibration has been checked against the NIST certified polyethylene BRPEO the values obtained being 53,000 for Mw and 19,000 for Mn.

Dynamic Rheological Analysis

Rheological measurements were carried out on an oscillatory rheometer (e.g., Rheometrics RDS-2, ARES) with 25 mm diameter parallel plates in a dynamic mode under an inert (nitrogen) atmosphere. For all experiments, the rheometer was thermally stable at 190° C. for at least 30 minutes before inserting the appropriately stabilised (with anti-oxidant additives), compression-moulded sample of resin onto the parallel plates. The plates were then closed with a positive normal force registered on the meter to ensure good contact. After about 5 minutes at 190° C., the plates were lightly compressed and the surplus polymer at the circumference of the plates trimmed. A further 10 minutes was allowed for thermal stability and for the normal force to decrease back to zero.

Two strain sweep (SS) experiments were initially carried out at 190° C. under nitrogen to determine the linear viscoelastic strain that would generate a torque signal which is greater than 10% of the lower scale of the transducer, over the full frequency (e.g. 0.01 to 100 rad/s) range. The first SS experiment was carried out with a low applied frequency of 0.1 rad/s so as to determine the sensitivity of the torque at low frequency. The second SS experiment was carried out with a high applied frequency of 100 rad/s to ensure that the selected applied strain is well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain under nitrogen (as determined by the SS experiments) to check the stability of the sample during testing.

The frequency sweep (FS) experiment was then carried out at 190° C. using the above appropriately selected strain level between dynamic frequencies range of $10^{-2}$ to 100 rad/s under a nitrogen atmosphere. The complex dynamic shear viscosities, $\eta^*(100)$ in Pa·s, at dynamic frequency of 100 rad/s, and $\eta^*(0.1)$, at a dynamic frequency of 0.1 rad/s, were determined directly from the viscosity data of the frequency sweep (FS) experiment measured at 190° C.

Measurement of Melt Elastic Modulus G'(G"=500 Pa) at 190° C.:

The frequency sweep (FS) experiment is then carried out at 190° C. using the above appropriately selected strain level and the dynamic rheological data thus measured are then analysed using the rheometer software (viz., Rheometrics RHIOS V4.4 or Orchestrator Software) to determine the melt elastic modulus G'(G"=500 Pa) at a constant, reference value (500 Pa) of melt viscous modulus (G").

Rheotens Extensional Rheometry

The melt strength of the polymer is measured at 190° C., using a Gottfed. Rheotens extensional rheometer in conjunction with a Gottfert Rheo-Tester 2000 Capillary Rheometer, with a barrel diameter of 12 mm. This is achieved by extruding the polymer at a constant pressure (P) through a die of 1.5 mm diameter and 30 mm in length, with a 90° entry angle.

The extrudate is drawn with a pair of gear wheels at an accelerating speed (V). The Gottfert Rheotens has a range of technical specifications including the acceleration rates of the drawing wheels, ranging from 0.12 to 1.2 cm/s$^2$. The typical acceleration used is 0.3 cm/s$^2$. This acceleration facility is necessary, and appropriately selected, to maintain tension and allow the continuous drawing of the extrudate by increasing drawing rates, for a given extrusion pressure at the die of the capillary rheometer. It facilitates the drawing of polymers extrudates exiting the extrusion die with differing flow rates (or velocities, Vo) depending on the extrusion pressures selected, without affecting the drawing force (F) experienced by the polymer extrudate (i.e., the actual values of their melt strength thus measured).

Once a given extrusion pressure is selected, the piston of the capillary rheometer will travel through its 12 mm diameter barrel at a speed that is sufficient to maintain that pressure constant using the constant pressure system of the rheometer. The nominal wall 1 shear rate ($\gamma$) for a given extrusion pressure can then be computed for the polymer at the selected pressure.

The drawing force (F) experienced by the extrudate is measured with a transducer and recorded together with the drawing speed. The maximum force at break is defined as melt strength (MS) at a constant extrusion pressure (P) or at its corresponding extrusion rate ($\gamma$). Three or four extrusion pressures (typically 6, 8, 12, 16 MPa) are selected for each polymer depending on its flow properties. For each extrusion pressure, a minimum of 3 MS measurements are performed and an average MS value is then obtained.

The derivative functions of the extrusion pressure and shear rate dependent melt strengths, $\delta(MS)/\delta(P)$, for each polymer are computed from the slopes (by a least square line fitting) of the plots of the average MS against extrusion pressure.

Processing of the Resin into Tapes

The polyethylene copolymers have been formed into tapes on a processing line comprising a film blowing unit and a Reifenhauser tapes stretching/annealing section where the rolls at these tapes sections are not thermally regulated:

The polymer material is first extruded, to produce film, on a Collin EP45 extruder equipped with an 80 mm diameter circular die and a film blowing equipment. The temperature profile of the extruder was 180-200-210-210-210° C. and the temperature at the die was 210° C. The film blowing conditions were tuned to reach a blow up ratio of about 2 and a neck-in of about 250 mm.

The drawdown rate of the first roll (VI) of the stretching section is set in order to obtain a film thickness of 85 m (for examples of table 3, the rate of the first roll varied from 4.4 to 8.4 m/min). The film is slit into tapes and a stretching in a first hot air oven (110° C.) is applied by fixing the draw rate of the second roll (V2) at a value higher than the draw rate of the first roll. The draw ratios (or stretching ratios) reported in table 3 are defined as the ratio V2/V1. The stretched tapes are then annealed by passing in hot air at 110° C. on a second oven; the rate of the third roll (V3) after this second oven is set at 90% of the rate of the second roll (V3/V2=0.90). The tapes are finally wound up before testing.

Mechanical Properties of the Resulting Tapes

The linear density (Tex) has been determined for each product and each draw ratio according to the teachings of the standard ISO2060. The Tex result is expressed in g of polymer by 1000 in of tape.

Tensile tests have been performed on the polymer tapes according to the teaching of the standard ISO2062 on a Hounsfield testing bench equipped with an Instron force transducer (2500 N maximum force). The length of the fiber sample between the two clamps was 200 mm and the drawing rate has been set to 200 mm/min. The tensile strength at break (in N) and the strain at break (i.e., elongation, in %) were recorded. The data reported in table 3 are average values computed from 10 independent measurements per sample with the assistance of HTE QMAT Testzone software supplied by Hounsfield Test Equipment Ltd.

Logarithmic (Power Law) Plot of Elongation (%) Against Tenacity

The tenacity (N/Tex)) was calculated from the following equation: (Tensile Strength at Break)/Tex, where Tex=weight (g) of 1000 m fibre. The elongation and tenacity of the materials at various stretched ratios are related and appeared to follow a power-law equation as shown below:

$$\text{Elongation (\%)} = C \times (\text{Tenacity})^X$$

BRIEF DESCRIPTION OF DRAWING

Thus, the gradient, or slope, $\delta \log(\text{Elongation})/\delta \log(\text{Tenacity}) = X$ can be calculated from the logarithmic-logarithmic plot of Elongation against Tenacity for all the stretched ratio ranges studied. FIG. 1 shows this for examples 1-5 of the present invention.

The invention claimed is:

1. A fibre, tape, filament or similar comprising a polyethylene composition comprising a copolymer of ethylene and a α-olefin said copolymer having
   (a) a density in the range 0.915-0.950 g/cm$^3$, and
   (b) a melt index MI$_2$ (2.16 kg,190° C.) in the range 0.7-50 g/10 min
   wherein said fibre, tape, filament or similar has a tenacity, elongation at break (%) and melt index wherein $[\epsilon \log(\text{elongation})/\delta(\text{tenacity})] \geq M \times (\text{melt index}) + C$ wherein M=−0.45 and C=−0.55.

2. A fibre, tape, filament or similar comprising a polyethylene composition comprising a copolymer of ethylene and a α-olefin having a unimodal molecular weight distribution said copolymer having
   (a) a density in the range 0.915-0.950 g/cm$^3$, and
   (b) a melt index MI$_2$ (2.16 kg,190° C.) in the range 0.7-50 g/10 min
   wherein said fibre, tape, filament or similar has a tenacity, elongation at break (%) and melt index wherein $[\delta \log(\text{elongation})/\delta(\text{tenacity})] \geq M \times (\text{melt index}) + C$ wherein M=−0.48 and C=−0.68.

3. A fibre, tape, filament or similar comprising a polyethylene composition comprising a copolymer of ethylene and a α-olefin prepared by polymerization in the presence of a single site catalyst system said copolymer having
   (a) a density in the range 0.915-0.950 g/cm$^3$, and
   (b) a melt index MI$_2$ (2.16 kg,190° C.) in the range 0.01-50 g/10 min
   wherein said fibre, tape, filament or similar has a tenacity, elongation at break (%) and melt index wherein $[\delta \log(\text{elongation})/\delta(\text{tenacity})] \geq M \times (\text{melt index}) + C$ wherein M=−0.43 and C=−1.2.

4. A fibre, tape, filament or similar according to claim 3 wherein M=−0.43 and C=−0.9.

5. A fibre, tape, filament or similar according to claim 3 wherein M=−0.43 and C=−0.78.

6. A fibre, tape, filament or similar comprising a polyethylene composition comprising a copolymer of ethylene and a α-olefin prepared by polymerization in the presence of a single site catalyst system said copolymer having
   (a) a density in the range 0.915-0.950 g/cm$^3$, and
   (b) a melt index MI$_2$ (2.16 kg,190° C.) in the range 0.01-50 g/10 min wherein said fibre, tape, filament or similar has a tenacity and elongation at break (%) wherein
   (i) elongation (%) $\geq 21.4 \times (\text{tenacity})^{-1.05}$
   (ii) tenacity $\geq 0.16$ N/Tex.

7. A fibre, tape, filament or similar according to claim 6 wherein elongation (%) $\geq 11.5 \times (\text{tenacity})^{-1.4}$.

8. A fibre, tape, filament or similar according to claim 1 wherein melt index is in the range 0.7-25 g/10 min.

9. A fibre, tape, filament or similar according to claim 1 wherein melt index is in the range 0.7-15 g/10 min.

10. A fibre, tape, filament or similar according to claim 1 wherein melt index is in the range 0.7-5 g/10 min.

11. A fibre, tape, filament or similar according to claim 1 wherein said polyethylene composition has a molecular weight distribution in the range 3 to 8.

12. A fibre, tape, filament or similar according to claim 1 being in a stretched form.

13. A fibre, tape, filament or similar according to claim 1 having a draw ratio in the range 1:4 to 1:10.

14. A fibre, tape, filament or similar according to claim 3 wherein said polyethylene composition has
   (i) a density in the range 0.915-0.950 g/cm$^3$,
   (ii) a melt index MI$_2$ (2.16 kg, 190° C.) in the range 0.01-50 g/10 min,
   (iii) a melt flow ratio (MFR) in the range 20 to 50,
   (iv) a molecular weight distribution (Mw/Mn) in the range 3 to 8, and
   (v) a melt strength pressure derivative $\delta(MS)/\delta P$ in the range 0.15-1.5.

15. A fibre, tape, filament or similar according to claim 3 wherein said polyethylene composition has
   (i) a density in the range 0.915-0.950 g/cm$^3$,
   (ii) a melt index MI$_2$ (2.16 kg, 190° C.) in the range 0.1-3.5 g/10 min,
   (iii) a melt elastic modulus G' (G"=500 Pa) in the range 40-150, and
   (iv) a ratio of complex dynamic shear viscosities $\eta^*(0.1)/\eta^*(100)$ in the range 1.5-5.5.

16. A fibre, tape, filament or similar according to claim 1 wherein said α-olefin comprises C4-C12 carbon atoms.

17. A fibre, tape, filament or similar according to claim 16 wherein said α-olefin comprises 1-hexene.

18. A fibre, tape, filament or similar according to claim 1 wherein said polyethylene composition is prepared by polymerization of ethylene and an α-olefin in the presence of a metallocene catalyst system.

19. A fibre, tape, filament or similar according to claim 18 wherein said metallocene catalyst system comprises a monocyclopentadienyl metallocene complex.

20. A fibre, tape, filament or similar according to claim 19 wherein said monocyclopentadienyl metallocene complex has the general formula:

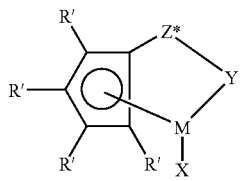

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms π-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

21. A fibre, tape, filament or similar according to claim 1 wherein said polyethylene composition comprises (a) a copolymer of ethylene and a α-olefin prepared by polymerization in the presence of a single site catalyst system and (b) a polymer prepared by polymerization in the presence of a Ziegler Natta catalyst system.

22. A fibre, tape, filament or similar according to claim 21 wherein said polyethylene composition comprises a polymer blend of (A) 1-99% by weight of a copolymer of ethylene and a α-olefin having from 3 to 10 carbon atoms, and (B) from 1-99% by weight of a copolymer of ethylene and a α-olefin having from 3 to 10 carbon atoms, prepared by polymerization in the presence of a single site catalyst system, wherein the sum of (A) and (B) is 100%, said copolymer blend having
   (a) a density in the range 0.915-0.950 g/cm$^3$, and
   (b) a melt index MI$_2$ (2.16 kg,190° C.) in the range 0.7-50 g/10 min
   wherein said fibre, tape, filament or similar has a tenacity, elongation at break (%) and melt index wherein $[\delta \log(\text{elongation})/\delta(\text{tenacity})] \geq M \times (\text{melt index}) + C$ wherein M=−0.45 and C=−0.55.

23. An article comprising fibre, tape, filament or similar according to claim 1.

24. An article according to claim 23 which is an artificial grass.

25. An article according to claim 23 which are woven and nonwoven fabrics.

26. An article according to claim 23 which are cordages, ropes and netting.

27. An article according to claim 23 which is a flexible intermediate bulk container (FIBC).

28. A fibre, tape, filament or similar according to claim 13 having a draw ratio in the range 1:5 to 1:10.

* * * * *